(12) United States Patent
Harris et al.

(10) Patent No.: US 10,691,662 B1
(45) Date of Patent: *Jun. 23, 2020

(54) GEO-TEMPORAL INDEXING AND SEARCHING

(71) Applicant: Palantir Technologies Inc., Palo Alto, CA (US)

(72) Inventors: Michael Harris, Palo Alto, CA (US); Jeff Wang, Palo Alto, CA (US); Bobby Prochnow, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 727 days.

This patent is subject to a terminal disclaimer.

(21) Appl. No.: 15/358,002

(22) Filed: Nov. 21, 2016

Related U.S. Application Data

(63) Continuation of application No. 13/728,879, filed on Dec. 27, 2012, now Pat. No. 9,501,507.

(51) Int. Cl.
*G06F 16/22* (2019.01)
*G06F 16/29* (2019.01)
*G06F 16/2458* (2019.01)

(52) U.S. Cl.
CPC ...... *G06F 16/2255* (2019.01); *G06F 16/2477* (2019.01); *G06F 16/29* (2019.01)

(58) Field of Classification Search
CPC ... G06F 16/2255; G06F 16/2477; G06F 16/29
See application file for complete search history.

(56) References Cited

U.S. PATENT DOCUMENTS

| | | |
|---|---|---|
| 4,899,161 A | 2/1990 | Morin et al. |
| 4,958,305 A | 9/1990 | Piazza |

(Continued)

FOREIGN PATENT DOCUMENTS

| | | |
|---|---|---|
| AU | 2012216622 | 5/2015 |
| CN | 102546446 | 7/2012 |

(Continued)

OTHER PUBLICATIONS

U.S. Appl. No. 14/225,160, filed Mar. 25, 2014, First Office Action Interview, dated Oct. 22, 2014.

(Continued)

*Primary Examiner* — Jorge A Casanova
(74) *Attorney, Agent, or Firm* — Hickman Palermo Becker Bingham LLP (57) ABSTRACT

A method and apparatus for a data analysis system for analyzing data object collections that include geo-temporal data is provided. One or more temporal granularities are specified for the purpose of generating a geo-temporal data index. The time granularities correspond to temporal ranges expected to correspond to temporal ranges specified in user queries against the data. One or more temporal index bucket groups are generated based on to the specified time granularities. Geo-temporal input data is indexed based on the generated temporal index bucket groups. The system allows a data analyst to specify geo-temporal queries that include both geospatial component and a temporal component. The system transforms geo-temporal queries into one or more second queries that retrieve data items based on the temporal index bucket groups.

16 Claims, 5 Drawing Sheets

(56) References Cited

U.S. PATENT DOCUMENTS

| | | |
|---|---|---|
| 5,329,108 A | 7/1994 | Lamoure |
| 5,754,182 A | 5/1998 | Kobayashi |
| 5,781,195 A | 7/1998 | Marvin |
| 5,781,704 A | 7/1998 | Rossmo |
| 6,091,956 A | 7/2000 | Hollenberg |
| 6,157,747 A | 12/2000 | Szeliski et al. |
| 6,169,552 B1 | 1/2001 | Endo et al. |
| 6,173,067 B1 | 1/2001 | Payton et al. |
| 6,178,432 B1 | 1/2001 | Cook et al. |
| 6,247,019 B1 | 6/2001 | Davies |
| 6,389,289 B1 | 5/2002 | Voce et al. |
| 6,414,683 B1 | 7/2002 | Gueziec |
| 6,430,305 B1 | 8/2002 | Decker |
| 6,483,509 B1 | 11/2002 | Rabenhorst |
| 6,529,900 B1 | 3/2003 | Patterson et al. |
| 6,631,496 B1 | 10/2003 | Li et al. |
| 6,662,103 B1 | 12/2003 | Skolnick et al. |
| 6,757,445 B1 | 6/2004 | Knopp |
| 6,828,920 B2 | 12/2004 | Owen et al. |
| 6,978,419 B1 | 12/2005 | Kantrowitz |
| 6,983,203 B1 | 1/2006 | Wako |
| 6,985,950 B1 | 1/2006 | Hanson et al. |
| 7,036,085 B2 | 4/2006 | Barros |
| 7,158,878 B2 | 1/2007 | Rasmussen et al. |
| 7,168,039 B2 | 1/2007 | Bertram |
| 7,375,732 B2 | 5/2008 | Arcas |
| 7,379,811 B2 | 5/2008 | Rasmussen et al. |
| 7,457,706 B2 | 11/2008 | Malero et al. |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,617,232 B2 | 11/2009 | Gabbert et al. |
| 7,617,314 B1 | 11/2009 | Bansod et al. |
| 7,620,628 B2 | 11/2009 | Kapur et al. |
| 7,663,621 B1 | 2/2010 | Allen et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,941,321 B2 | 5/2011 | Greenstein et al. |
| 7,945,852 B1 | 5/2011 | Pilskains |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,065,080 B2 | 11/2011 | Koch |
| 8,085,268 B2 | 12/2011 | Carrino et al. |
| 8,134,457 B2 | 3/2012 | Velipasalar et al. |
| 8,145,703 B2 | 3/2012 | Frishert et al. |
| 8,200,676 B2 | 6/2012 | Frank |
| 8,214,361 B1 | 7/2012 | Sandler et al. |
| 8,214,764 B2 | 7/2012 | Gemmell et al. |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,290,838 B1 | 10/2012 | Thakur et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,302,855 B2 | 11/2012 | Ma et al. |
| 8,325,178 B1 | 12/2012 | Doyle, Jr. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,589,273 B2 | 11/2013 | Creeden et al. |
| 8,688,573 B1 | 4/2014 | Ruknoic et al. |
| 8,742,934 B1 | 6/2014 | Sarpy et al. |
| 8,781,169 B2 | 7/2014 | Jackson et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,868,535 B1 * | 10/2014 | Paiz ............. G06F 16/951 |
| | | 707/706 |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 8,953,887 B2 * | 2/2015 | Chen ............. G06F 16/29 |
| | | 382/190 |
| 8,983,494 B1 | 3/2015 | Onnen et al. |
| 9,009,177 B2 | 4/2015 | Zheng et al. |
| 9,021,384 B1 | 4/2015 | Beard et al. |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,129,219 B1 | 9/2015 | Robertson et al. |
| 9,146,125 B2 | 9/2015 | Vulcano et al. |
| 9,280,618 B1 | 3/2016 | Bruce et al. |
| 2002/0003539 A1 | 1/2002 | Abe |
| 2002/0033848 A1 | 3/2002 | Sciammarella et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2002/0147805 A1 | 10/2002 | Leshem et al. |
| 2003/0009493 A1 | 1/2003 | Parker et al. |
| 2003/0052896 A1 | 3/2003 | Higgins et al. |
| 2003/0103049 A1 | 6/2003 | Kindratenko et al. |
| 2003/0126102 A1 | 7/2003 | Borthwick |
| 2003/0144868 A1 | 7/2003 | MacIntyre et al. |
| 2003/0163352 A1 | 8/2003 | Surpin et al. |
| 2003/0200192 A1 | 10/2003 | Bell et al. |
| 2003/0225755 A1 | 12/2003 | Iwayama et al. |
| 2004/0030492 A1 | 2/2004 | Fox et al. |
| 2004/0034570 A1 | 2/2004 | Davis |
| 2004/0039498 A1 | 2/2004 | Ollis et al. |
| 2004/0098236 A1 | 5/2004 | Mayer et al. |
| 2004/0143602 A1 | 7/2004 | Ruiz et al. |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0031197 A1 | 2/2005 | Knopp |
| 2005/0034062 A1 | 2/2005 | Bufkin et al. |
| 2005/0080769 A1 | 4/2005 | Gemmell |
| 2005/0086207 A1 | 4/2005 | Heuer et al. |
| 2005/0143602 A1 | 6/2005 | Yada et al. |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0223044 A1 | 10/2005 | Ashworth et al. |
| 2005/0267652 A1 | 12/2005 | Allstadt et al. |
| 2006/0026120 A1 | 2/2006 | Carolan et al. |
| 2006/0090141 A1 | 4/2006 | Loui et al. |
| 2006/0139375 A1 | 6/2006 | Rasmussen et al. |
| 2006/0143075 A1 | 6/2006 | Carr et al. |

(56) References Cited

U.S. PATENT DOCUMENTS

| | | |
|---|---|---|
| 2006/0143079 A1 | 6/2006 | Basak et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0241974 A1 | 10/2006 | Chao et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott et al. |
| 2007/0115373 A1 | 5/2007 | Gallagher et al. |
| 2007/0188516 A1 | 8/2007 | Loup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0284433 A1 | 12/2007 | Domenica et al. |
| 2007/0294643 A1 | 12/2007 | Kyle |
| 2008/0010605 A1 | 1/2008 | Frank |
| 2008/0040678 A1 | 2/2008 | Crump |
| 2008/0040684 A1 | 2/2008 | Crump |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0132251 A1 | 6/2008 | Altman et al. |
| 2008/0133579 A1 | 6/2008 | Lim |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0208820 A1* | 8/2008 | Usey .................... G06F 16/313 |
| 2008/0222295 A1 | 9/2008 | Robinson et al. |
| 2008/0223834 A1 | 9/2008 | Griffiths et al. |
| 2008/0229056 A1 | 9/2008 | Agarwal et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0026170 A1 | 1/2009 | Tanaka et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0106178 A1 | 4/2009 | Chu |
| 2009/0112745 A1 | 4/2009 | Stefanescu |
| 2009/0115786 A1 | 5/2009 | Shmiasaki et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0222400 A1 | 9/2009 | Kupershmidt et al. |
| 2009/0249244 A1 | 10/2009 | Robinson et al. |
| 2009/0271343 A1 | 10/2009 | Vaiciulis et al. |
| 2009/0292626 A1 | 11/2009 | Oxford |
| 2009/0300528 A1 | 12/2009 | Stambaugh |
| 2009/0307049 A1 | 12/2009 | Elliott et al. |
| 2009/0313463 A1 | 12/2009 | Pang et al. |
| 2009/0319418 A1 | 12/2009 | Herz |
| 2010/0042922 A1 | 2/2010 | Bradateanu et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0070842 A1 | 3/2010 | Aymeloglu et al. |
| 2010/0076968 A1 | 3/2010 | Boyns et al. |
| 2010/0098318 A1 | 4/2010 | Anderson |
| 2010/0106420 A1 | 4/2010 | Mattikalli et al. |
| 2010/0161735 A1 | 6/2010 | Sharma |
| 2010/0162176 A1 | 6/2010 | Dunton |
| 2010/0185692 A1 | 7/2010 | Zhang et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0262688 A1 | 10/2010 | Hussain et al. |
| 2010/0277611 A1 | 11/2010 | Holt et al. |
| 2010/0293174 A1 | 11/2010 | Bennett et al. |
| 2010/0321399 A1 | 12/2010 | Ellren et al. |
| 2011/0022312 A1 | 1/2011 | McDonough et al. |
| 2011/0061013 A1 | 3/2011 | Bilicki et al. |
| 2011/0078173 A1 | 3/2011 | Seligmann et al. |
| 2011/0090254 A1 | 4/2011 | Carrino et al. |
| 2011/0093327 A1 | 4/2011 | Fordyce, III et al. |
| 2011/0099133 A1 | 4/2011 | Chang et al. |
| 2011/0109435 A1* | 5/2011 | Bickel ................ G01C 21/3679 340/8.1 |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0153384 A1 | 6/2011 | Horne et al. |
| 2011/0161096 A1 | 6/2011 | Buehler et al. |
| 2011/0170799 A1 | 7/2011 | Carrino et al. |
| 2011/0173093 A1 | 7/2011 | Psota et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270604 A1 | 11/2011 | Qi et al. |
| 2011/0270705 A1 | 11/2011 | Parker |
| 2011/0289397 A1 | 11/2011 | Eastmond et al. |
| 2011/0314007 A1 | 12/2011 | Dassa et al. |
| 2012/0011238 A1 | 1/2012 | Rathod |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0079363 A1 | 3/2012 | Folting et al. |
| 2012/0084118 A1 | 4/2012 | Bai et al. |
| 2012/0106801 A1 | 5/2012 | Jackson |
| 2012/0131512 A1 | 5/2012 | Takeuchi et al. |
| 2012/0144335 A1 | 6/2012 | Abeln et al. |
| 2012/0148158 A1* | 6/2012 | DeSpain .................. G06K 9/46 382/190 |
| 2012/0158527 A1 | 6/2012 | Cannelongo et al. |
| 2012/0159362 A1 | 6/2012 | Brown et al. |
| 2012/0159363 A1 | 6/2012 | DeBacker et al. |
| 2012/0173381 A1 | 7/2012 | Smith |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221553 A1 | 8/2012 | Wittmer et al. |
| 2012/0221580 A1 | 8/2012 | Barney |
| 2011/0323888 | 12/2012 | Osann, Jr. |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0073550 A1* | 3/2013 | Obayashi ................ H04W 4/02 707/736 |
| 2013/0076732 A1 | 3/2013 | Cervelli et al. |
| 2013/0096988 A1 | 4/2013 | Grossman et al. |
| 2013/0100134 A1 | 4/2013 | Cervelli et al. |
| 2013/0101159 A1 | 4/2013 | Chao et al. |
| 2013/0132398 A1 | 5/2013 | Pfiefle |
| 2013/0150004 A1 | 6/2013 | Rosen |

(56) References Cited

U.S. PATENT DOCUMENTS

| | | |
|---|---|---|
| 2013/0151453 A1 | 6/2013 | Bhanot et al. |
| 2013/0166480 A1 | 6/2013 | Popescu et al. |
| 2013/0176321 A1 | 7/2013 | Mitchell et al. |
| 2013/0179420 A1 | 7/2013 | Park et al. |
| 2013/0185307 A1 | 7/2013 | El-Yaniv et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0254900 A1 | 9/2013 | Sathish et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0282723 A1 | 10/2013 | Petersen et al. |
| 2013/0290825 A1 | 10/2013 | Arndt et al. |
| 2013/0297619 A1 | 11/2013 | Chandarsekaran et al. |
| 2013/0339891 A1 | 12/2013 | Blumenberg et al. |
| 2014/0012796 A1 | 1/2014 | Petersen et al. |
| 2014/0040371 A1 | 2/2014 | Gurevich et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0157172 A1 | 6/2014 | Peery et al. |
| 2014/0164502 A1 | 6/2014 | Khodorenko et al. |
| 2014/0176606 A1 | 6/2014 | Narayan et al. |
| 2014/0189536 A1 | 7/2014 | Lange et al. |
| 2014/0195515 A1 | 7/2014 | Baker et al. |
| 2014/0218400 A1 | 8/2014 | O'Toole et al. |
| 2014/0222793 A1 | 8/2014 | Sadkin et al. |
| 2014/0333651 A1 | 11/2014 | Cervelli et al. |
| 2014/0337772 A1 | 11/2014 | Cervelli et al. |
| 2014/0358829 A1 | 12/2014 | Hurwitz |
| 2014/0361899 A1 | 12/2014 | Layson |
| 2014/0366132 A1 | 12/2014 | Stiansen et al. |
| 2015/0029176 A1 | 1/2015 | Baxter et al. |
| 2015/0100897 A1 | 4/2015 | Sun et al. |
| 2015/0100907 A1 | 4/2015 | Erenrich et al. |
| 2015/0106170 A1 | 4/2015 | Bonica |
| 2015/0106379 A1 | 4/2015 | Elliot et al. |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0188872 A1 | 7/2015 | White |
| 2015/0312323 A1 | 10/2015 | Peterson |
| 2015/0338233 A1 | 11/2015 | Cervelli et al. |
| 2015/0379413 A1 | 12/2015 | Robertson et al. |

FOREIGN PATENT DOCUMENTS

| | | |
|---|---|---|
| CN | 103167093 | 6/2013 |
| CN | 102054015 | 5/2014 |
| DE | 102014204827 | 9/2014 |
| DE | 102014204830 | 9/2014 |
| DE | 102014204834 | 9/2014 |
| DE | 102013222023 | 1/2015 |
| EP | 0 763 201 | 3/1997 |
| EP | 2 575 107 | 4/2013 |
| EP | 2858014 | 4/2015 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| GB | 2516155 | 1/2015 |
| NL | 2012778 | 11/2014 |
| NZ | 624557 | 12/2014 |
| WO | WO 95/032424 | 11/1995 |
| WO | WO 2000/009529 | 2/2000 |
| WO | WO 2001/098925 | 12/2001 |
| WO | WO 2004/057268 | 7/2004 |
| WO | WO 2005/013200 | 2/2005 |
| WO | WO 2008/064207 | 5/2008 |
| WO | WO 2009/061501 | 5/2009 |
| WO | WO 2009/123975 | 10/2009 |
| WO | WO 2011/058507 | 5/2011 |

OTHER PUBLICATIONS

U.S. Appl. No. 14/225,160, filed Mar. 25, 2014, Advisory Action, dated May 20, 2015.
U.S. Appl. No. 14/294,098, filed Jun. 2, 2014, First Office Action Interview, dated Aug. 15, 2014.
U.S. Appl. No. 13/948,859, filed Jul. 23, 2013, Notice of Allowance, dated Dec. 10, 2014.
U.S. Appl. No. 14/451,221, filed Aug. 4, 2014, Office Action, dated Oct. 21, 2014.
U.S. Appl. No. 14/225,006, filed Mar. 25, 2014, First Office Action Interview, dated Feb. 27, 2015.
U.S. Appl. No. 14/225,160, filed Mar. 25, 2014, Final Office Action, dated Feb. 11, 2015.
U.S. Appl. No. 14/225,160, filed Mar. 25, 2014, First Office Action Interview, dated Jul. 29, 2014.
U.S. Appl. No. 14/225,084, filed Mar. 25, 2014, First Office Action Interview, dated Feb. 20, 2015.
U.S. Appl. No. 14/289,596, filed May 28, 2014, Advisory Action, dated Apr. 30, 2015.
U.S. Appl. No. 14/289,596, filed May 28, 2014, Final Office Action, dated Jan. 26, 2015.
U.S. Appl. No. 13/728,879, filed Dec. 27, 2012, First Office Action Interview, dated Jan. 27, 2015.
U.S. Appl. No. 14/225,006, filed Mar. 25, 2014, First Office Action Interview, dated Sep. 10, 2014.
U.S. Appl. No. 14/463,615, filed Aug. 19, 2014, Final Office Action, dated May 21, 2015.
U.S. Appl. No. 14/483,527, filed Sep. 11, 2014, First Office Action Interview, dated Jan. 28, 2015.
U.S. Appl. No. 14/225,084, filed Mar. 25, 2014, First Office Action Interview, dated Sep. 2, 2014.
U.S. Appl. No. 14/289,599, filed May 28, 2014, Final Office Action, dated May 29, 2015.
U.S. Appl. No. 12/840,673, filed Jul. 21, 2010, Notice of Allowance, dated Apr. 6, 2015.
U.S. Appl. No. 14/294,098, filed Jun. 2, 2014, Notice of Allowance, dated Dec. 29, 2014.
U.S. Appl. No. 14/479,863, filed Sep. 8, 2014, First Office Action Interview, dated Dec. 26, 2014.
U.S. Appl. No. 14/294,098, filed Jun. 2, 2014, Final Office Action, dated Nov. 6, 2014.
U.S. Appl. No. 14/255,084, filed Mar. 25, 2014, Notice of Allowance, dated May 4, 2015.
U.S. Appl. No. 14/289,599, filed May 28, 2014, First Office Action Interview, dated Jul. 22, 2014.
U.S. Appl. No. 14/463,615, filed Aug. 19, 2014, First Office Action Interview, dated Nov. 13, 2014.
U.S. Appl. No. 13/827,491, filed Mar. 14, 2013, Office Action, dated Dec. 1, 2014.
U.S. Appl. No. 12/840,673, filed Jul. 21, 2010, Final Office Action, dated Jan. 2, 2015.
U.S. Appl. No. 14/483,527, filed Sep. 11, 2014, Final Office Action, dated Jun. 22, 2015.
U.S. Appl. No. 14/289,596, filed May 28, 2014, First Office Action Interview, dated Jul. 18, 2014.
U.S. Appl. No. 14/479,863, filed Sep. 8, 2014, Notice of Allowance, dated Mar. 31, 2015.
U.S. Appl. No. 14/319,161, filed Jun. 30, 2014, Notice of Allowance, dated May 4, 2015.
U.S. Appl. No. 13/728,879, filed Dec. 27, 2012, Interview Summary, dated Mar. 17, 2015.
U.S. Appl. No. 14/571,098, filed Dec. 15, 2014, First Office Action Interview, dated Mar. 11, 2015.
U.S. Appl. No. 14/571,098, filed Dec. 15, 2014, First Office Action Interview, dated Aug. 5, 2015.

(56) References Cited

OTHER PUBLICATIONS

U.S. Appl. No. 13/728,879, filed Dec. 27, 2012, Notice of Allowance, dated Jun. 21, 2016.
U.S. Appl. No. 14/225,084, filed Mar. 25, 2014, Notice of Allowance, dated May 4, 2015.
U.S. Appl. No. 14/552,336, filed Nov. 24, 2014, First Office Action Interview, dated Jul. 20, 2015.
U.S. Appl. No. 14/463,615, filed Aug. 19, 2014, First Office Action Interview, dated Jan. 28, 2015.
U.S. Appl. No. 12/840,673, dated Jul. 21, 2010, Office Action, dated Sep. 17, 2014.
U.S. Appl. No. 13/827,491, filed Mar. 14, 2013, Final Office Action, dated Jun. 22, 2015.
U.S. Appl. No. 14/319,161, filed Jun. 30, 2014, Final Office Action, dated Jan. 23, 2015.
U.S. Appl. No. 14/929,584, filed Nov. 2, 2015, Final Office Action, dated May 25, 2016.
U.S. Appl. No. 14/934,004, filed Nov. 5, 2015, First Office Action Interview, dated Feb. 16, 2016.
U.S. Appl. No. 14/289,596, filed May 28, 2014, Office Action, dated May 9, 2016.
U.S. Appl. No. 14/929,584, filed Nov. 2, 2015, Office Action, dated Feb. 4, 2016.
U.S. Appl. No. 14/289,599, filed May 28, 2014, Advisory Action, dated Sep. 4, 2015.
U.S. Appl. No. 14/490,612, filed Sep. 18, 2014, Final Office Action, dated Aug. 18, 2015.
U.S. Appl. No. 14/730,123, filed Jun. 3, 2015, First Office Action Interview, dated Sep. 21, 2015.
U.S. Appl. No. 14/730,123, filed Jun. 3, 2015, Notice of Allowance, dated Apr. 12, 2016.
U.S. Appl. No. 13/728,879, filed Dec. 27, 2012, Final Office Action, dated Aug. 12, 2015.
U.S. Appl. No. 13/728,879, filed Dec. 27, 2012, Office Action, dated Nov. 20, 2015.
POI Editor, "How to: Create Your Own Points of Interest," <http://www.poieditor.com/articles/how_to_create_your_own_points_of_interest/> printed Jul. 22, 2012 in 4 pages.
Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.
Vivid Solutions, "JTS Topology Suite: Technical Specifications," <http://www.vividsolutions.com/jts/bin/JTS%20Technical%20Specs.pdf> Version 1.4, 2003, pp. 36.
Hansen et al., "Analyzing Social Media Networks with NodeXL: Insights from a Connected World", Chapter 4, pp. 53-67 and Chapter 10, pp. 143-164, published Sep. 2010.
Notice of Acceptance for Australian Patent Application No. 2012216622 dated Jan. 6, 2015.
Vose et al., "Help File for ModelRisk Version 5," 2007, Vose Software, pp. 349-353. [Uploaded in 2 Parts].
Piwik—Free Web Analytics Software. <http://piwik.org/> Printed Jul. 19, 2013 in18 pages.
Official Communication for New Zealand Patent Application No. 622473 dated Jun. 19, 2014.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Haralick et al., "Image Analysis Using Mathematical Morphology," Pattern Analysis and Machine Intelligence, IEEE Transactions, Jul. 1987, vol. PAMI-9, No. 4, pp. 532-550.
Huang et al., "Systematic and Integrative Analysis of Large Gene Lists Using DAVID Bioinformatics Resources," Nature Protocols, 4.1, 2008, 44-57.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Definition "Identify", downloaded Jan. 22, 2015, 1 page.
Gorr et al., "Crime Hot Spot Forecasting: Modeling and Comparative Evaluation", Grant 98-IJ-CX-K005, May 6, 2002, 37 pages.
APSALAR, "Data Powered Mobile Advertising," "Free Mobile App Analytics" and various analytics related screen shots <http://apsalar.com> Printed Jul. 18, 2013 in 8 pages.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Official Communication for Great Britain Patent Application No. 1404499.4 dated Jun. 11, 2015.
Localytics—Mobile App Marketing & Analytics, <http://www.localytics.com/> Printed Jul. 18, 2013 in 12 pages.
Snyder, "Map Projections—A Working Manual," U.S. Geological Survey Professional paper 1395, United States Government Printing Office, Washington: 1987, pp. 11-21 and 60-70.
Official Communication for European Patent Application No. 14187996.5 dated Feb. 12, 2015.
Hua et al., "A Multi-attribute Data Structure with Parallel Bloom Filters for Network Services", HiPC 2006, LNCS 4297, pp. 277-288, 2006.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.
Ipbucker, C., "Inverse Transformation for Several Pseudocylindrical Map Projections Using Jacobian Matrix," ICCSA 2009, Part 1 LNCS 5592, pp. 553-564.
Capptain—Pilot Your Apps, <http://www.capptain.com> Printed Jul. 18, 2013 in 6 pages.
Official Communication for Netherlands Patent Application No. 2012778 dated Sep. 22, 2015.
Tangelder et al., "Freeform Shape Matching Using Minkowski Operations," The Netherlands, Jun. 1996, pp. 12.
Wongsuphasawat et al., "Visual Analytics for Transportation Incident Data Sets," Transportation Research Record 2138, 2009, pp. 135-145.
Reibel et al., "Areal Interpolation of Population Counts Using Pre-classi_ed Land Cover Data," Population Research and Policy Review, 2007, vol. 26, pp. 619-633.
StatCounter—Free Invisible Web Tracker, Hit Counter and Web Stats, <http://statcounter.com/> Printed Jul. 19, 2013 in 17 pages.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Griffith, Daniel A., "A Generalized Huff Model," Geographical Analysis, Apr. 1982, vol. 14, No. 2, pp. 135-144.
UserMetrix, <http://usermetrix.com/android-analytics> printed Jul. 18, 2013 in 3 pages.
Official Communication for European Patent Application No. 14187739.9 dated Jul. 6, 2015.
Map of San Jose, CA. Retrieved Oct. 2, 2013 from http://maps.bing.com.
Official Communication for Great Britain Patent Application No. 1404489.5 dated May 21, 2015.
Official Communication for Great Britain Patent Application No. 1404489.5 dated Aug. 27, 2014.
Valentini et al., "Ensembles of Learning Machines", M. Marinaro and R. Tagliaferri (Eds.): WIRN VIETRI 2002, LNCS 2486, pp. 3-20.
Reibel, M., "Geographic Information Systems and Spatial Data Processing in Demography: a Review," Population Research and Policy Review, 2007, vol. 26, pp. 601-618.
Official Communication for Australian Patent Application No. 2014213553 dated May 7, 2015.
Official Communication for European Patent Application No. 14191540.5 dated May 27, 2015.

(56) References Cited

OTHER PUBLICATIONS

Cohn, et al., "Semi-supervised clustering with user feedback," Constrained Clustering: Advances in Algorithms, Theory, and Applications 4.1 (2003): 17-32.
Official Communication in New Zealand Application No. 628840 dated Aug. 28, 2014.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
VB Forums, "Buffer a Polygon," Internet Citation, <http://www.vbforums.com/showthread.php?198436-Buffer-a-Polygon>, Specifically Thread #1, #5 & #11 retrieved on May 2, 2013, pp. 8.
Official Communication for Australian Patent Application No. 2014202442 dated Mar. 19, 2015.
Mandagere, Nagapramod, "Buffer Operations in GIS," <http://www-users.cs.umn.edu/~npramod/enc_pdf.pdf> retrieved Jan. 28, 2010, pp. 7.
Official Communication for Great Britain Patent Application No. 1404486.1 dated May 21, 2015.
Definition "Overlay", downloaded Jan. 22, 2015, 1 page.
Map of San Jose, CA. Retrieved Oct. 2, 2013 from http://maps.yahoo.com.
Official Communication for Netherlands Patent Application No. 2011632 dated Feb. 8, 2016.
Open Street Map, "Amm's Diary:Unconnected ways and other data quality issues," http://www.openstreetmap.org/user/amm/diary printed Jul. 23, 2012 in 3 pages.
trak.io, <http://trak.io/> printed Jul. 18, 2013 in 3 pages.
Manno et al., "Introducing Collaboration in Single-user Applications through the Centralized Control Architecture," 2010, pp. 10.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
Gu et al., "Record Linkage: Current Practice and Future Directions," Jan. 15, 2004, pp. 32.
Wang et al., "Research on a Clustering Data De-Duplication Mechanism Based on Bloom Filter," IEEE 2010, 5 pages.
Flurry Analytics, <http://www.flurry.com/> Printed Jul. 18, 2013 in 14 pages.
Woodbridge, Stephen, "[geos-devel] Polygon simplification," <http://lists.osgeo.org/pipermail/geos-devel/2011-May/005210.html> dated May 8, 2011, pp. 3.
Huff et al., "Calibrating the Huff Model Using ArcGIS Business Analyst," ESRI, Sep. 2008, pp. 33.
"Andy Turner's GISRUK 2012 Notes" <https://docs.google.com/document/d/1cTmxg7mVx5gd89IqbICYvCEnHA4QAivH4I4WpyPsqE4/edit?pli=1> printed Sep. 16, 2013 in 15 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-c553-ui-20120117/#resizing-amp-overflow retrieved on May 18, 2015.
Official Communication for European Patent Application No. 14200298.9 dated May 13, 2015.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
TestFlight—Beta Testing on the Fly, <http://testflightapp.com/> Printed Jul. 18, 2013 in 3 pages.
Kontagent Mobile Analytics, <http://www.kontagent.com/> Printed Jul. 18, 2013 in 9 pages.
DISTIMO—App Analytics, <http://www.distimo.com/app-analytics> Printed Jul. 18, 2013 in 5 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10.
Official Communication for Great Britain Patent Application No. 1404499.4 dated Sep. 29, 2014.
Keylines.com, "KeyLines Datasheet," Mar. 2014, <http://keylines.com/wp-content/uploads/2014/03/KeyLines-datasheet.pdf> downloaded May 12, 2014 in 2 pages.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Ghosh, P., "A Solution of Polygon Containment, Spatial Planning, and Other Related Problems Using Minkowski Operations," Computer Vision, Graphics, and Image Processing, 1990, vol. 49, pp. 1-35.
Barnes et al., "Viewshed Analysis", GIS-ARC/INFO 2001, <www.evsc.virginia.edu/~jhp7e/evsc466/student_pres/Rounds.pdf>.
Official Communication for New Zealand Patent Application No. 628161 dated Aug. 25, 2014.
Huff, David L., "Parameter Estimation in the Huff Model," ESRI, ArcUser, Oct.-Dec. 2003, pp. 34-36.
Official Communication for Great Britain Patent Application No. 1404486.1 dated Aug. 27, 2014.
Wikipedia, "Douglas_Peucker-Algorithms," <http://de.wikipedia.org/w/index.php?title=Douglas-Peucker-Algorithmus&oldid=91846042> printed Jul. 17, 2015, pp. 2.
Levine, N., "Crime Mapping and the Crimestat Program," Geographical Analysis, 2006, vol. 38, pp. 41-56.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Thompson, Mick, "Getting Started with GEO," Getting Started with GEO, Jul. 26, 2011.
Sigrist, et al., "PROSITE, a Protein Domain Database for Functional Characterization and Annotation," Nucleic Acids Research, 2010, vol. 38, pp. D161-D166.
Official Communication for New Zealand Patent Application No. 628585 dated Aug. 26, 2014.
Official Communication for Great Britain Patent Application No. 1404499.4 dated Aug. 20, 2014.
Official Communication for New Zealand Patent Application No. 622513 dated Apr. 3, 2014.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Official Communication for Great Britain Patent Application No. 1404489.5 dated Oct. 6, 2014.
Hibbert et al., "Prediction of Shopping Behavior Using a Huff Model Within a GIS Framework," Healthy Eating in Context, Mar. 18, 2011, pp. 16.
Map of San Jose, CA. Retrieved Oct. 2, 2013 from http://maps.google.com.
Official Communication for New Zealand Patent Application No. 622473 dated Mar. 27, 2014.
Countly Mobile Analytics, <http://count.ly/> Printed Jul. 18, 2013 in 9 pages.
SONRIS, "Using the Area of Interest Tools," <http://web.archive.org/web/20061001053327/http://sonris-www.dnr.state.la.us/gis/instruct_files/tutslide12> printed Jan. 3, 2013 in 1 page.
Google Analytics Official Website—Web Analytics & Reporting, <http://www.google.com/analytics.index.html> Printed Jul. 18, 2013 in 22 pages.
Official Communication for Great Britain Patent Application No. 1408025.3 dated Nov. 6, 2014.
"A First Look: Predicting Market Demand for Food Retail using a Huff Analysis," TRF Policy Solutions, Jul. 2012, pp. 30.

(56) References Cited

OTHER PUBLICATIONS

AMNET, "5 Great Tools for Visualizing Your Twitter Followers," posted Aug. 4, 2010, http://www.amnetblog.com/component/content/article/115-5-grate-tools-for-visualizing-your-twitter-followers.html.
APPACTS, "Smart Thinking for Super Apps," <http://www.appacts.com> Printed Jul. 18, 2013 in 4 pages.
GIS-NET 3 Public _ Department of Regional Planning. Planning & Zoning Information for UNINCORPORATED LA County. Retrieved Oct. 2, 2013 from http://gis.planning.lacounty.gov/GIS-NET3_Public/Viewer.html.

\* cited by examiner

GEO-TEMPORAL INDEXING AND SEARCHING

BENEFIT CLAIM

This application claims the benefit under 35 U.S.C. § 120 as a continuation of application Ser. No. 13/728,879, filed Dec. 27, 2012, the entire contents of which is hereby incorporated herein by reference for all purposes as if fully set forth herein. The applicant(s) hereby rescind any disclaimer of claim scope in the parent application(s) or the prosecution history thereof and advise the USPTO that the claims in this application may be broader than any claim in the parent applications.

TECHNICAL FIELD

The present disclosure generally relates to computer-based analysis of geospatial data that includes a temporal component.

BACKGROUND

Data analysts and other computer users often interact with and request data from computer-based databases containing large collections of data objects. The data object collections may be generated and collected by various corporations, businesses, governmental agencies, and other organizations and often represent huge amounts of data. For example, the data may include DNS traffic logs, transaction logs of banks, call data records, or any other potentially high-volume data.

One particular type of data that such organizations may often collect and analyze is geospatial data. Geospatial data generally represents any data that includes a geographical component and that associates the data with particular geographic locations or areas. For example, a crime enforcement agency may track data that corresponds to crime reports received within a particular city. One item of information stored in association with each crime report may include a geographical component indicating a location of the incident specified by the crime report. An example data object representing each crime report may include values representing a longitude and latitude corresponding to the geographical location of the incident. A data analyst with access to such data may then specify geospatial search requests such as, for example, a search request for crime reports associated with incidents within a specified geographical radius or within a four block perimeter.

Organizations also frequently collect data that includes a temporal component. A temporal component generally refers to one or more data values that indicate a particular point in time, such as a date and/or time of day, or a range of time. For example, in reference to the example crime report information, a crime enforcement agency may store in association with each crime report a time value indicating an approximate time the incident in the crime report occurred. In the example, by storing the temporal information, data analysts may specify requests for data objects associated with a particular time range of interest, for example, all crime reports associated with an incident that occurred within the past three months.

Databases have provided mechanisms for efficiently indexing and searching geospatial data for a number of years. These mechanisms include geospatial indices that transform the geospatial data into values that are well-suited for database indexing while preserving a notion of geographical locality in the indexed data. However, indexing and searching for geo-temporal data presents a number of challenges that are not resolved by today's geospatial indexing techniques. For example, because the notion of geographical locality does not accurately translate to the added dimensionality of time, the use of geospatial indexing mechanisms on geo-temporal data often results in highly inefficient processing of geo-temporal queries. Further, user requests for geo-temporal data are often focused on highly varied granularities of time for reasons practical to desired lines of inquiries on the data, but that complicate efforts to efficiently index the data.

The present disclosure attempts to address these problems and others, facilitating low latency searches of large and dynamic data sets that include geo-temporal data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described herein according to the following outline:

1.0 General Overview
    2.0 Structural and Functional Overview
        2.1 Data Sources
        2.2 Data Repository
        2.3 Geo-temporal Data Importation
            2.3.1 Indexing Geospatial Data
            2.3.2 Indexing Geo-temporal Data
    3.0 Example Geo-temporal Search Operation
    4.0 Implementation Mechanisms—Hardware Overview
    1.0 General Overview The present disclosure is directed to computer systems and methods for indexing and searching geo-temporal data stored in a data repository. Geo-temporal data generally refers to data that includes both a geospatial component and a temporal component. The geospatial component may comprise one or more stored data values indicating a geographic location and the temporal component may comprise one or more values indicating a point in time or range of time. In general terms, in order to more efficiently process requests for geo-temporal data stored in a key-value data repository, a geo-temporal indexing structure is generated and managed in computer memory; for example, indexes may be stored on disk and cached in memory on demand. In an embodiment, the geo-temporal indexing structure is based in part on user input specifying one or more time sets or granularities that are likely to correspond to time ranges specified in user requests for the stored and indexed geo-temporal data.

The geo-temporal data may be obtained from potentially multiple disparate data sources and examples of geo-temporal data include, but are not limited to, network traffic logs, bank transaction records, phone call records, crime data, or any other data that includes both a geospatial and temporal component. In an embodiment, the geo-temporal data is received and indexed in a data repository based on a geospatial component of the data. In an embodiment, the indexing of the geo-temporal data based on the geospatial component may be based on Z-order curves, Hilbert curves, or any other geospatial indexing technique.

In an embodiment, in addition to geospatially indexing the geo-temporal data, the data is further indexed in the data repository based on a temporal component of the data and based on received user input specifying one or more time granularities that a user may, for example, anticipate to be time granularities that are likely to correspond to user requests against the indexed data. Examples of various time granularities that may be used in embodiments, or together in one embodiment, include years, months, days, and any other useful measure of time. In an embodiment, a "temporal index bucket" group comprising one or more temporal index buckets is created in the data repository for each of the user-specified time granularities. In an embodiment, each temporal index bucket of a temporal index bucket group corresponds to a particular range of time equal to the corresponding time granularity for that bucket group. Each particular temporal index bucket includes one or more references to geospatially indexed data objects that are associated with a temporal value that falls within the particular range of time associated with the particular temporal index bucket.

For example, if a user involved in the importation of geo-temporal data is aware that user requests are likely to be received for geo-temporal data within particular month ranges, the user may specify a time granularity of months for the indexing of the imported geo-temporal data. In the example, in response to receiving the user input, a temporal index bucket group is created for the specified time granularity of months. The temporal index bucket group includes one or more temporal index buckets that each correspond to a particular month time range and each particular index bucket indexes a portion of the geo-temporal data that is associated with a temporal component that falls within the particular month time range for that particular bucket. If a user additionally specifies a time granularity of days for the same data, a separate temporal index bucket group is created for day time ranges and indexes the geo-temporal data into temporal index buckets of individual day time ranges.

In an embodiment, requests for geo-temporal data indexed in a data repository are processed using one or more of the generated index bucket groups. For example, a geo-temporal request may be a query specifying one or more geospatial search parameters and one or more temporal search parameters. In an embodiment, a geo-temporal request for geo-temporal data indexed according to the methods described herein is transformed into one or more second requests against one or more temporal index buckets based on the temporal component specified in the request. For example, assume particular geo-temporal data includes data with temporal components associated with time values falling within each of the years 2000-2010 and is indexed according to a time granularity of years. The temporal index bucket group may then include a temporal index bucket for each of the years 2000, 2001, 2002, and so forth. If a geo-temporal query is received specifying a particular geospatial and a temporal range spanning the years 2008 and 2009, the geo-temporal query may be transformed into separate queries against the 2008 and 2009 temporal index buckets.

2.0 Structural and Functional Overview

Figure 1:
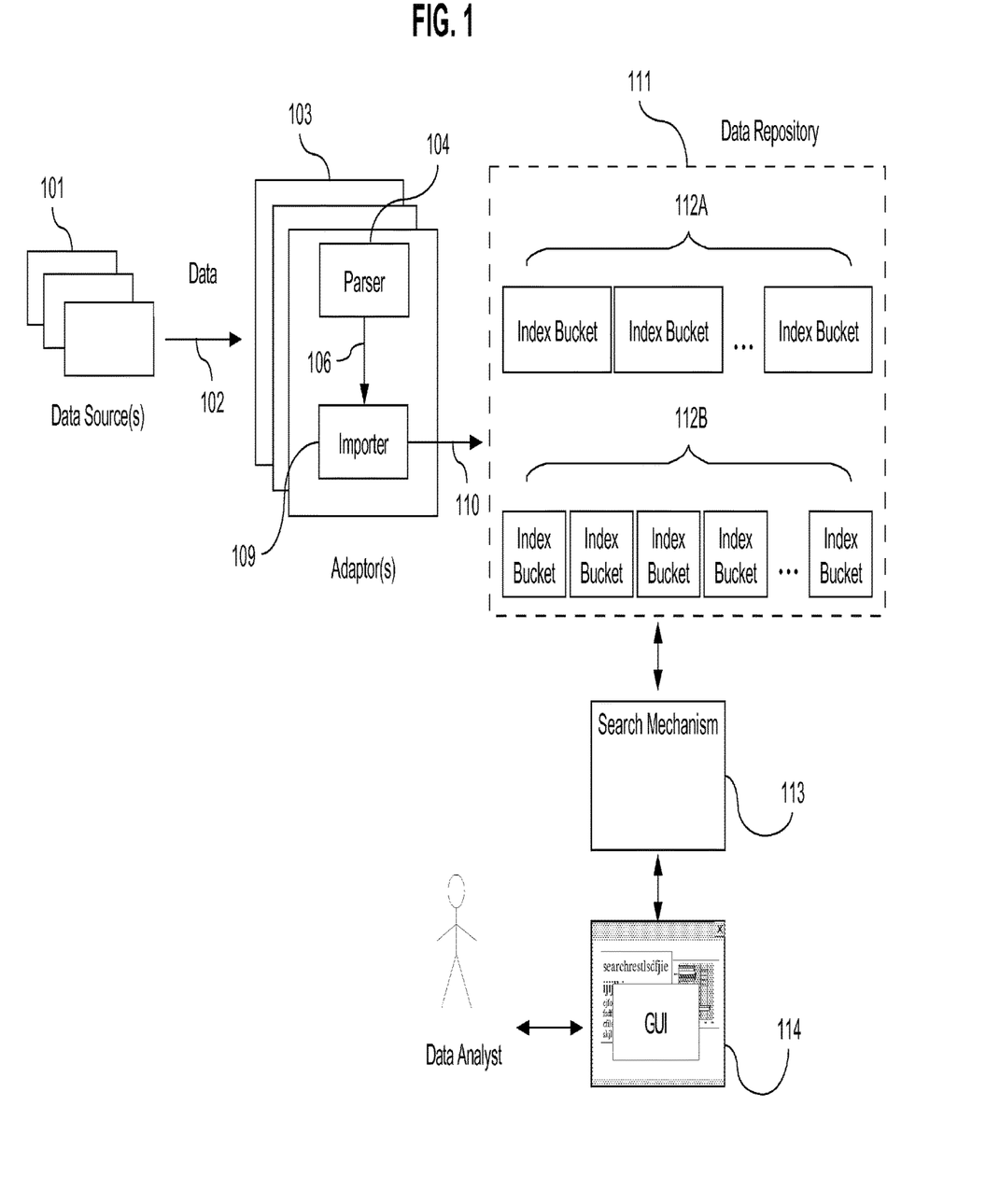
FIG. 1 illustrates an example computer system comprising a set of interconnected functional modules for indexing and searching geo-temporal data.

FIG. 1 illustrates an example computer system for indexing and searching geo-temporal data. In an embodiment, an organization or entity may manage one or more data sources 101 that generate data, perhaps continuously or on an ongoing or periodic basis. Any sizeable organization will typically manage multiple data sources 101 that generate a large amount of data. Example data sources 101 include databases, log files, transaction logs, call data records, access logs, netflows, authentication logs, authorization logs, e-mail message spools, and any other container for data.

2.1 Data Sources

Data generated by data sources 101 includes, but is not limited to, any data that reflects an activity of an individual person or organization. The activity may be an online activity, such as, for example, accessing a website, sending or receiving an e-mail, or making an online payment with a credit card or an offline activity such as, for example, using a key card to gain access to a building. Data generated by data sources 101 also includes, but is not limited to, geo-temporal data. Geo-temporal data is data that may reflect activities such as those identified above and other activities that include both a geospatial component and a temporal component. For example, geo-temporal data may reflect cell phone call records that are each associated with data values reflecting a particular geographic location of the cell phone and a particular time that the call was made or received.

Typically, but not always, data generated by data sources 101 adheres to some sort of data structure or data format. For example, data stored in a database may adhere to a relational database structure or related schema. As another example, data in a log file, including geo-temporal data, may be formatted in eXtensible Markup Language (XML), Keyhole Markup Language (KML), or in plain-text (e.g., ASCII) with whitespace characters (e.g., tab, space, and newline characters) providing structure, or generally any other machine-parseable character based format.

Data sources 101 of an organization may generate and collect large amounts of data that includes geo-temporal data. Organizations would appreciate a way to efficiently analyze these collections of data including geo-temporal data to quickly identify information of interest or information pertinent to a line of inquiry. Information included in geo-temporal data may be requested in geo-temporal queries that specify one or more geospatial search parameters corresponding to geographical areas of interest and one or more temporal search parameters corresponding to points in time or time ranges of interest. The geo-temporal information reflecting activities of interest may be as varied along the geospatial and temporal dimensions as, for example, a request for all activities within a single city block within the past five years to all activities within an entire city within the past five hours.

One approach for processing a geo-temporal query is to first perform a geographically-focused search for all data objects reflecting activities in the specified geographical area and subsequently filtering the returned geographical results based on the specified temporal range. However, processing queries in this manner often may result in filtering of the majority of the geographically-focused search results because the vast majority of the results may fall outside of the temporal range specified in a query. For example, if a large volume of crime report data is recorded for a particular geographic area over a period of many years and a user subsequently submits a query for crime reports in the particular geographic area for the past day, the majority of data returned by a geographically-focused search will be filtered out in order to refine the results to the specified temporal range.

Referring again to FIG. 1, in an embodiment a data processing system comprises a data repository 111, one or more adaptors 103, and a search mechanism 113 with an interface 114. The data repository 111, the adaptors(s) 103, the search mechanism 113, and the interface 114 may be interconnected to one another using any suitable data communication mechanism such as, for example, one or more data networks. The one or more data networks may include one or more local area networks (LANs), one or more wide area networks (WANs), or internetworks such as the public Internet. The components of the system may be distributed across one or more computer systems such as the computer system 500 of FIG. 5, which is further described herein. When distributed across multiple computer systems, components may additionally be distributed geographically, for example, across one or more data centers.

2.2 Data Repository

The data repository 111 may operate on one or more computing nodes of a cluster of computing nodes. The computing nodes may be interconnected via a communication bus such as one or more local area data networks, one or more wide area data networks, the Internet, or other suitable data network or communication mechanism. In an embodiment, data stored in data repository 111 may be stored as key-value pairs. In an embodiment, in order to handle large data sets, the stored key-value pairs may be distributed across the computing nodes of the cluster.

In some embodiments, the data repository 111 is implemented using the Apache Cassandra distributed database management system. Apache Cassandra is an open source software project maintained by the Apache Software Foundation and currently available online at the Internet domain cassandra.apache.org. In other embodiments, the data repository 111 is implemented using the Apache HBase distributed database management system. Apache HBase is open source software maintained by the Apache Software Foundation and currently available online at the Internet domain hbase.apache.org. However, other distributed key-value data store systems may be used for the data repository 111 and the present embodiments are not limited to only the Apache Cassandra or the Apache HBase system.

2.3 Geo-Temporal Data Importation

The adaptor(s) 103 are configured to consume input data 102 and store the data in the data repository 111. There may be an adaptor 103 for each type of data source 101. For example, there may be an adaptor for ingesting input data 102 produced by a database system data source 101 and another adaptor 103 for a web access log data source 101. In an embodiment, at least one adaptor 103 is configured to ingest geo-temporal data from a data source 101.

In this context, the term "input data" refers to data that is presented as input to the system. That is, data that is obtained by an adaptor 103 from a data source 101 for processing and possible input into the data repository 111. The term "geo-temporal data" refers to any input data that includes one or more values representing a geospatial component and one or more values representing a temporal component. For example, values representing a geospatial component may include one or more numerical values specifying a longitude and latitude or any other representation of a geographical location. A temporal component includes one or more values specifying one or more points in time and may be specified, for example, by a character string or numerical value representing a midnight Coordinated Universal Time (UTC) value or any other representation of time values.

An adaptor 103 may obtain input data 102 through any number of means including receiving input data 102 from a data source 101 or retrieving input data 102 from a data source 101. If receiving, the adaptor 103 may, for example, receive the input data 102 in one or more network messages or event notifications. In this case, the adaptor 103 may have a network listener to which the data source 101 can connect and provide the network message or event notification. If retrieving, the adaptor 103 may, for example, periodically access or connect to a data source 101 to obtain input data 102 as a network client of the data source 101. Other techniques for obtaining input data 102 may be used according to the requirements of the implementation at hand in various embodiments and no particular technique is required.

In some embodiments, a parser 104 produces a stream of data blocks and a stream of index keys and values and an importer 109 produces a stream of key-value pairs 110 from the stream of data blocks and index keys and values produced by parser 104.

The stream of input data 102 processed by an adaptor 103 may be obtained continuously or essentially continuously by the adaptor 103 as data sources 101 generate new data. For example, an adaptor 103 for a web access log file may obtain input data 102 as a web server process is writing to the log file. In this case, where the stream of input data 102 is continuous or essentially continuous, the data repository 111 is also continuously or essentially continuously updated with new data blocks and new key-value pairs 110. Old or stale data can be purged from the data repository 111 to effectively provide a rolling window of an organization's data. Alternatively, an adaptor 103 may be configured to obtain a fixed amount of data to create a snapshot of the organization's data in the repository 111. A combination of continuous or essentially continuous data streams and a fixed amount of data may be used as well. For example, some adaptors 103 may be configured to obtain input data 102 from data sources 101 continuously or essentially continuously while other adaptors 103 may be configured to obtain a set amount of input data 102 from other data sources 101.

As mentioned, in one embodiment, the data processing pipeline of an adaptor 103 includes a parser 104 and an importer 109. It will be understood that these and other associated building blocks and components of an adaptor 103, may be configured as stand-alone logic elements, or may be combined together in one or more assemblies, as needed or appropriate for the particular implementation at hand. A logic element may be implemented in software, hardware, or combination of hardware and software.

2.3.1 Indexing Geospatial Data

In an embodiment, input data 102 that includes a geospatial component may be specified as geospatially searchable. For example, a user may configure parser 104 and/or importer 109 to identify particular data items of input data 102 as geospatially searchable data. In other embodiments, data items of input data 102 may be specified as geospatially searchable by default and without user input. In general, geospatially searchable data may be searched using queries that specify one or more geographical search parameters such as, for example, latitude and longitude values that define a geographical area. In an embodiment, input data 102 that includes a geospatial component and that is specified to be geospatially searchable is geospatially indexed in the data repository 111, as further described below.

In an embodiment, input data 102 that is specified as geospatially searchable is geospatially indexed in the data repository 111 by a parser 104 and an importer 109 of an adaptor 103. One responsibility of a parser 104 is to divide the stream of input data 102 into discrete data blocks. The data blocks are stored in the data repository 111 and indexed by key-value pairs stored in the data repository by the importer 109. Each data block may be optionally compressed by the parser 104 using any suitable lossless data compression algorithm, or the parser 104 may send the data blocks to the data repository 111 uncompressed where they are compressed by the data repository 111. Any number of methods may be used to divide the input data 102 stream into data blocks including division of the input data 102 by logical data entity boundaries or into uniformly sized data blocks. In an embodiment, one responsibility of the importer 109 is to store the index keys and values in the data repository 111 in a manner that indexes the data blocks generated by the parser 104.

In an embodiment, input data 102 that is geospatially indexed may be stored in one or more data blocks, as described above, and indexed based on an index key that is derived from the geospatial component of the data. For example, in an embodiment, the index key for geospatially indexed data may be a Z-order curve value that is generated based on the geospatial data component of the data. In general, a Z-order curve value is a one-dimensional representation of a multidimensional data representation. The one-dimensional representation may be a single numeric value and the multidimensional data representation may be numeric values representing a longitude and latitude corresponding to a geographic location. A Z-order curve value may be generated, for example, by interleaving the binary values of each of the values of the two-dimensional representation. In an embodiment, a generated Z-order curve value is used to index a data block containing the data item associated with the geospatial value represented by the generated Z-order curve value. The geospatial indexing technique described above is provided only as an example and the present embodiments are not limited to the Z-order curve geospatial indexing technique.

2.3.2 Indexing Geo-Temporal Data

Figure 3:
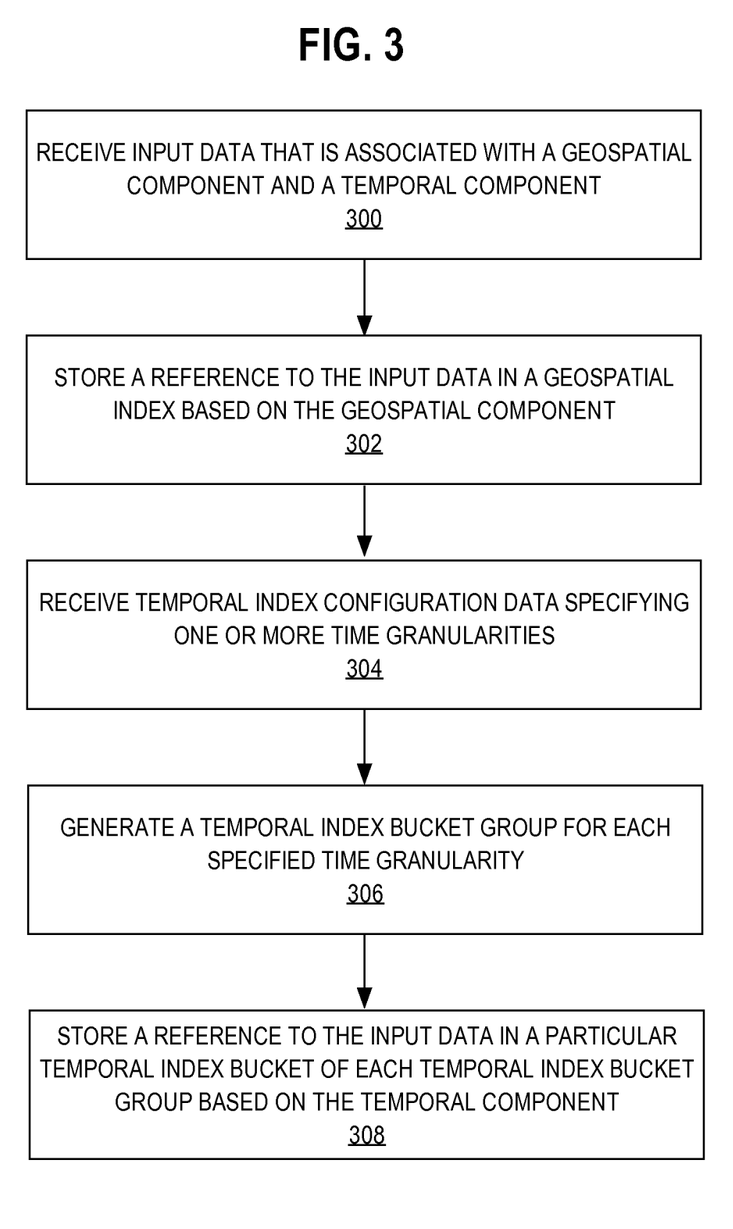
FIG. 3 illustrates a flowchart illustrating a process of indexing geo-temporal data

Similar to the specification of particular input data 102 as geospatially searchable, in an embodiment, input data 102 may include geo-temporal data that is specified as geo-temporally searchable. FIG. 3 is a flow diagram of a process for indexing geo-temporal data in accordance with one or more embodiments described herein. Initially, geo-temporal input data is received that is associated with a geospatial component and a temporal component (block 300). The geo-temporal input data is indexed in a geospatial index based on the geospatial component (block 302). For example, the geo-temporal data may be indexed in data repository 111 according to a geospatial indexing technique such as the techniques described above.

In an embodiment, temporal index configuration data is received specifying one or more time granularities (e.g., years, months, days, hours, etc.) (block 304). In an embodiment, the temporal index configuration data may be specified by a user involved in the importation of input data 102 by using, for example, interface 114. In other embodiments, the particular time granularities may be specified as part of a data import configuration file or other user input mechanisms. In an embodiment, the particular time granularities may be specified before, during, or after the input data 102 is imported into data repository 111. For example, geo-temporal data that has previously been geospatially indexed may be re-indexed based on a temporal component, or geo-temporal data of input data 102 may be contemporaneously geospatially and temporally indexed at the time of data importation.

In an embodiment, based on the received temporal index configuration data, an index bucket group is generated for each time granularity specified in the temporal index configuration data (block 306). In an embodiment, the generation of a temporal index bucket group includes storing a copy of the geospatial index data in one or more temporal index buckets. Each particular temporal index bucket in a temporal index bucket group represents a particular range of time spanning an amount of time equal to the time granularity of the temporal index bucket group. In an embodiment, each temporal index bucket group stores a copy of the geospatial index data, with each index entry of the geospatial index stored in a particular temporal index bucket. The particular temporal index bucket storing each geospatial index entry is the temporal index bucket that is associated with a time range that includes the value specified by the temporal component of the data object referenced by the geospatial index entry. For example, if a temporal index bucket group is generated for a time granularity of years, and a particular data object of input data 102 includes a temporal component specifying a time value that falls within the year 2010, the geospatial index entry for that data object may be stored in a temporal index bucket representing the year 2010 in the year granularity temporal index bucket group. In an embodiment, each temporal index bucket is stored in data repository 111 and represented by a row key in the distributed key-value data repository.

In general, the user-specified time granularities correspond to time granularities that are expected by the user or others to be specified in geo-temporal queries against the data as stored in data repository 111. For example, an analyst involved in the importation of geo-temporal data may be aware that users often desire to search for data objects associated with particular geographic regions and that are associated with temporal components within particular year time spans and/or particular hour time spans. In the example, an analyst involved in the importation of data may specify temporal index configuration data indicating two time granularities for the geo-temporal input data: a year time granularity and an hour time granularity. For example, temporal index bucket group 112A in FIG. 1 may correspond to the index bucket group for the year time granularity and temporal index bucket group 112B may correspond to the index bucket group for the hour granularity. In the example, generated temporal index buckets of temporal index bucket group 112A may represent particular year timespans (e.g., 1978, 2002, 2009, 2012) and generated temporal index buckets of temporal index bucket group 112B may represent particular day timespans (e.g., Mar. 15, 1978; Jan. 10, 2009).

In an embodiment, based on the temporal component of the input data, an indexed reference to the input data is stored in a particular temporal index bucket of each generated temporal index bucket group (block 308). In an embodiment, if a temporal index bucket in a particular temporal index bucket group does not yet exist for the temporal value specified by the input data, a new temporal index bucket is generated for the temporal index bucket group. In reference to the example temporal index bucket groups 112A and 11B, if input data is received specifying a temporal component value corresponding to the date Jan. 10, 2009 and no temporal bucket exists in day granularity temporal index bucket group 112B corresponding to January 10, a new temporal index bucket is generated.

3.0 Example Search Operation

For the purposes of clearly illustrating how the functions described herein operate upon geo-temporal queries, the following sections describe an example graphical user interface display for specifying a geo-temporal query. However, the graphical user interface display described herein represents only a selected example of a visualization for the geo-temporal query operations that are described herein. Thus, the disclosure broadly encompasses any method of creating and processing geo-temporal queries that are described herein. In the following description, it will be assumed for the sake of illustration that the geo-temporal search functionality is provided by a combination of a search mechanism 113 and the data repository 111. However, this is just one possible implementation. Other implementations where the search functionality is provided entirely be the data repository 111 or a combination of the data repository 111, a search mechanism 113, and one or more other system component(s) are also possible.

Further, no particular graphical user interface is required and the disclosure is intended to encompass the geo-temporal query processing approaches that are described independent of any graphical user interface, and it is not intended to be limited to any particular graphical user interface or other form of display. For example, the example graphical user interface merely represents one way to receive input from a user to specify a geo-temporal query; in other embodiments, programmatic methods may be used to obtain the same query specification information and other forms of data output may be used such as logging, reporting, storing in database tables, storing in spreadsheets, etc.

Figure 2:
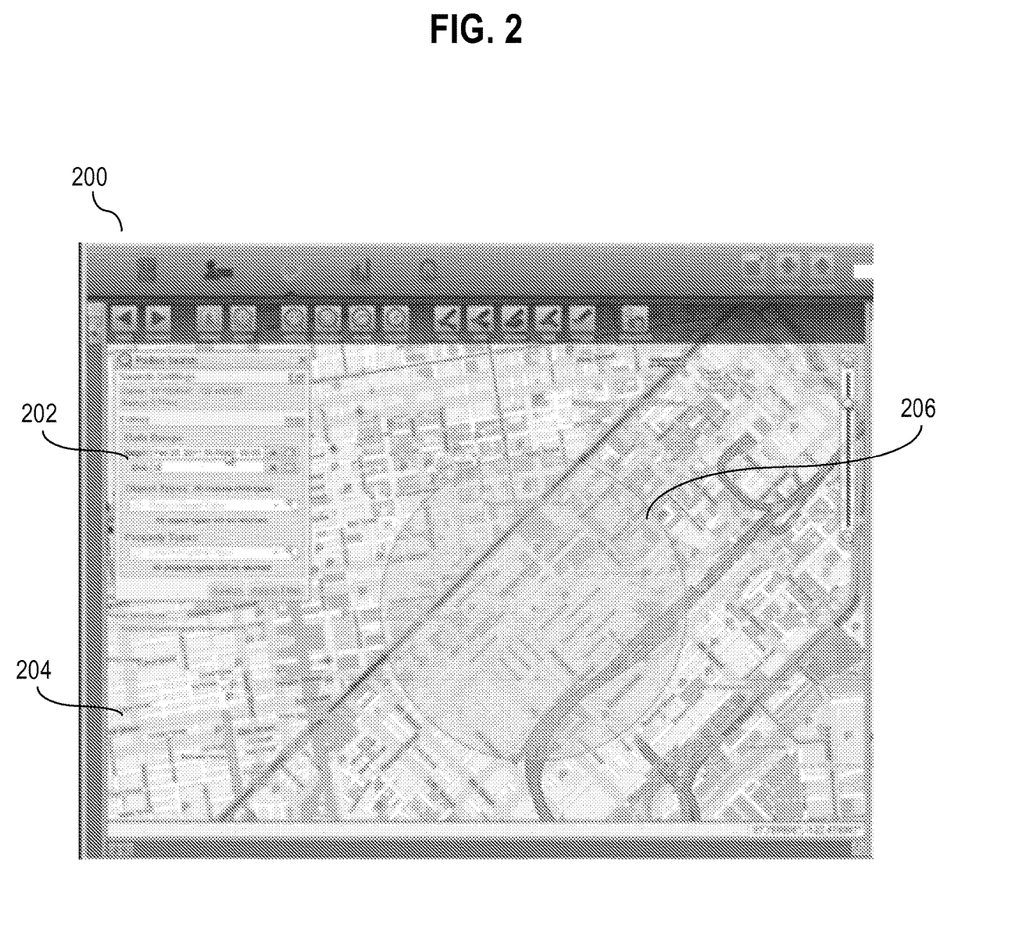
FIG. 2 is an example graphical user interface for a computer display for specifying a geo-temporal query.

In general, a search mechanism 113 receives as input a set of geo-temporal search parameters and provides as output a set of search results. FIG. 2 illustrates an example graphical user interface 200 that enables a user to specify a set of search parameters for a geo-temporal query. Graphical user interface 200 includes interface components that enable a user to specify both a geospatial bounding area and a time value or range of time values as geospatial and temporal search parameters, respectively.

Interface component 204 illustrates a representation of a geographical map that may be used to specify one or more desired geospatial bounding areas. For example, bounding area 206 represents an example bounding area that a user may specify on the map using an input mechanism such as, for example, a mouse pointer to draw the bounding area on the map. In an embodiment, a specified bounding area such as bounding area 206 defines a geographical area of interest to the user that will be specified as a geospatial search parameter in a resulting geo-temporal query. For example, if a user was interested in stored data objects pertaining to a particular geographical area around the user's home, the user may specify a bounding area that includes both the geographical location of the user's home and any surrounding area of interest using interface component 204. In an embodiment, a bounding area may be defined using a number of shapes including, but not limited to, a radial or polygonal bounding area.

In an embodiment, a user may additionally specify a temporal range of interest using graphical user interface 200. In an embodiment, a specified temporal range for a geo-temporal query may include one or more of a start date and/or time value and an end date and/or time value. Graphical interface component 202 illustrates an example interface component enabling a user to specify a temporal range as a search parameter. An interface component such as interface component 202 may include, among other input elements, one or more input elements for entering date and time values. For example, a user may enter one or more dates using text boxes, a calendar, or any other interface component for entering dates and/or time values. In addition to specifying a temporal range, interface component 202 may include one or more additional input parameters enabling the specification of one or more other search parameters, for example, a search string, a sort order, etc.

In an embodiment, a geo-temporal query may be generated based on the input received at graphical user interface 200. For example, search mechanism may transform the user input received at graphical user interface 200 into a textual representation of a geo-temporal query that includes search parameters corresponding to the user input received at graphical user interface 200. After the geo-temporal query is generated, the geo-temporal query may be processed by search mechanism 113.

Figure 4:
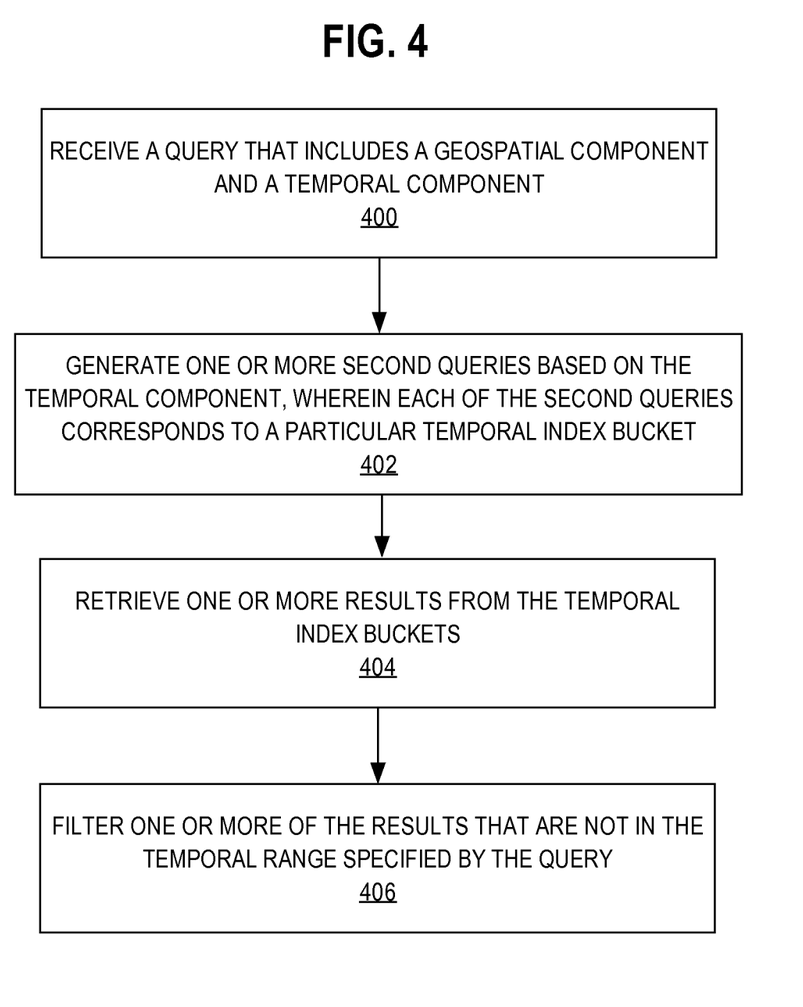
FIG. 4 illustrates a flowchart illustrating processing a geo-temporal query.

FIG. 4 illustrates a flow diagram of a process for carrying out a geo-temporal query in accordance with one or more of embodiments described herein. In an embodiment, a search query is received (block 400) that includes both a geospatial component and a temporal component. In response to receiving a query, one or more second queries are generated (block 402), with each of the second queries corresponding to a particular temporal index bucket of a temporal index bucket group. In an embodiment, the temporal index buckets are selected to correspond to the temporal component of the query. For example, assume that particular geo-temporal data has been indexed into a first temporal index bucket group based on a time granularity of years and a second temporal index bucket group based on a time granularity of days. If a geo-temporal query is received that specifies a temporal range of Jan. 1, 2011 to Jan. 2, 2012, the system may transform the geo-temporal query into a second query against the bucket corresponding to the data year 2011 and two additional second queries corresponding to the days of Jan. 1, 2012 and Jan. 2, 2012.

In response to each of the second queries, zero or more results are returned from each of the particular temporal index buckets (block 404). The results returned from each of the temporal index buckets are those results that satisfy the geospatial component of the query. Thus, in an embodiment, processing each of the second queries includes processing the geospatial component of the geo-temporal query on the data stored in each of the buckets. For example, if the data in data repository 111 is geospatially indexed using Z-order curve values, the geospatial component of the query may be transformed into one or more Z-order values and the values may be used to return corresponding results from each of the temporal index buckets. In an embodiment, the zero or more results returned from each of the one or more temporal index buckets are aggregated to form an initial result set.

In an embodiment, processing a geo-temporal query may include one more steps of post-filtering. As a result of the particular partitioning of the temporal index buckets, the result set returned by the one or more second queries may include one or more data items that are not within the exact temporal range specified by the geo-temporal query. In an embodiment, the search mechanism 113 may filter (block 406) the one or more results that are not within the specified temporal range. For example, assume that a geo-temporal index is created using a specified time granularity of an hour, resulting in a temporal index bucket group with one or more temporal index buckets of hour time ranges (e.g., 1:00 pm-2:00 pm, 2:00 pm-3:00 pm, 3:00 pm-4:00 pm, etc.). An example geo-temporal query may then include a temporal search parameter specifying a time range on a particular day between 2:15 pm and 3:15 pm. In response to receiving the example geo-temporal query, the search mechanism 113 may transform the query into two queries that query the temporal index buckets that index data objects associated with a temporal value between the time ranges of 2:00 pm-3:00 pm and 3:00 pm-4:00 pm, respectively. After retrieving any data objects from either or both of the two index buckets that satisfy any geospatial component of the query, search mechanism 113 may post-filter the data object results in order to filter any data objects that are associated with a temporal value outside of the range specified in the query, i.e., those data objects in the temporal ranges of 2:00 pm-2:14 pm and 3:16 pm-4:00 pm.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
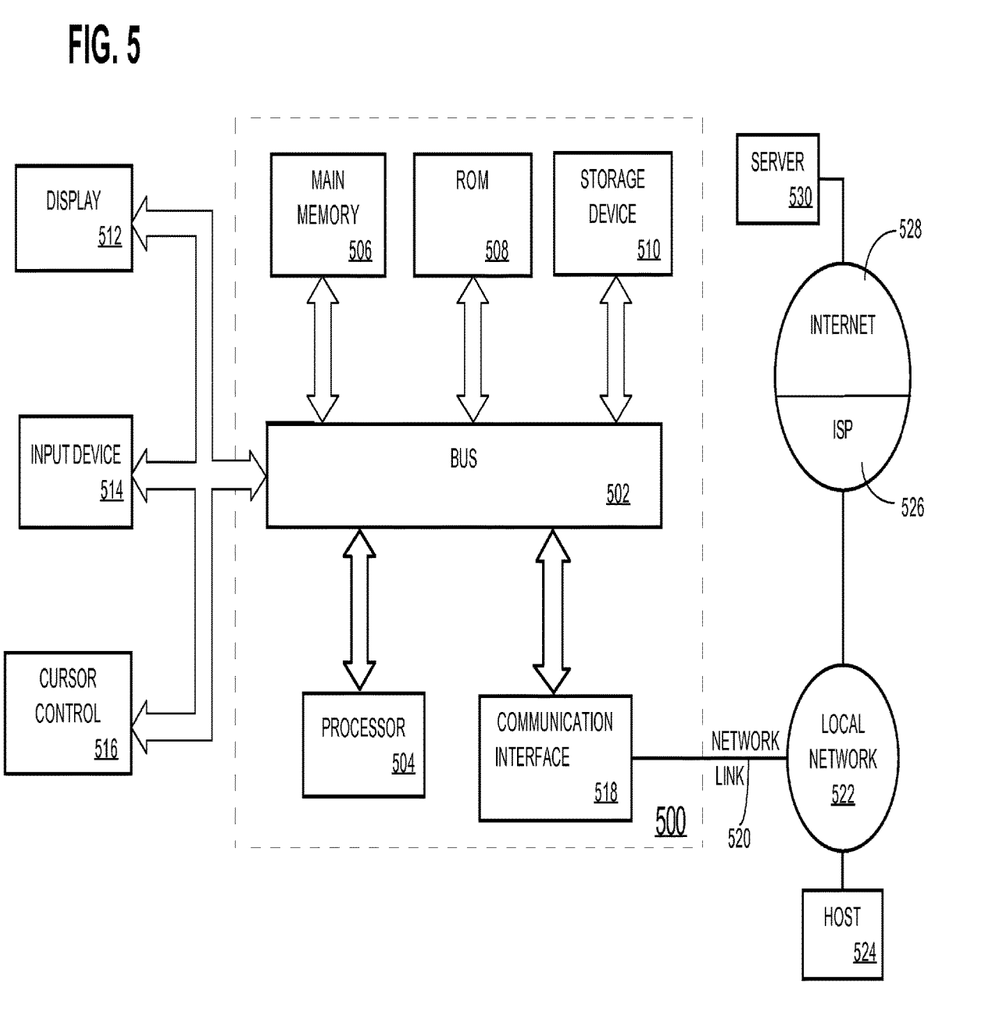
FIG. 5 illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

What is claimed is:

1. A computer-implemented method for indexing data items that are associated with a geospatial component and a time component, the computer-implemented method comprising:
    receiving a data item that is associated with at least a geospatial component and a time component;
    storing a reference to the data item in a geospatial index based on the geospatial component;
    receiving time index configuration data indicating a first time granularity, a second time granularity, and a third time granularity;
    generating a first plurality of database index buckets for the first time granularity, a second plurality of database index buckets for the second time granularity, and a third plurality of database index buckets for the third time granularity;
    storing, based on the time component, a second reference to the data item in a database index bucket of the first plurality, the second plurality, and the third plurality;
    receiving a search request comprising at least a second time component;
    generating at least two search queries using the second time component retrieving one or more data items using the at least two search queries;
    wherein the method is performed by one or more computing devices.

2. The method of claim 1, wherein the second time component comprises a time range.

3. The method of claim 2, further comprising filtering one or more of the one or more data items retrieved by the two search queries that are not in the time range specified by the search request.

4. The method of claim 1, wherein the geospatial component comprises a Z-order geographic value.

5. The method of claim 1, wherein the time component comprises a value representing a date and time.

6. The method of claim 1, wherein the first time granularity, the second time granularity, and the third time granularity are specified by a user or based on requirements of a user-specified query.

7. The method of claim 1, wherein the first time granularity, the second time granularity, and the third time granularity are one of seconds, minutes, hours, days, months, years, decades, centuries.

8. The method of claim 1, wherein each of the first plurality of database index buckets is identified by a hash value.

9. A non-transitory computer-readable medium storing one or more sequences of instructions, which when executed by one or more processors, cause the one or more processors to carry out the steps of:
    receiving a data item that is associated with at least a geospatial component and a time component;
    storing a reference to the data item in a geospatial index based on the geospatial component;
    receiving time index configuration data indicating a first time granularity, a second time granularity, and a third time granularity;
    generating a first plurality of database index buckets for the first time granularity, a second plurality of database index buckets for the second time granularity, and a third plurality of database index buckets for the third time granularity;
    storing, based on the time component, a second reference to the data item in a database index bucket of the first plurality, the second plurality, and the third plurality;
    receiving a search request comprising at least a second time component;
    generating at least two search queries using the second time component;
    retrieving one or more data items using the at least two search queries.

10. The non-transitory computer readable medium of claim 9, wherein said second time component comprises a time range.

11. The non-transitory computer readable medium of claim 10, further comprising filtering one or more of the one or more data items retrieved by the two search queries that are not in the time range specified by the search request.

12. The non-transitory computer readable medium of claim 9, wherein the geospatial component comprises a Z-order geographic value.

13. The non-transitory computer readable medium of claim 9, wherein said time component comprises a value representing a date and time.

14. The non-transitory computer readable medium of claim 9, wherein the first time granularity, the second time granularity, and the third time granularity are specified by a user or based on requirements of a user-specified query.

15. The non-transitory computer readable medium of claim 9, wherein the first time granularity, the second time granularity, and the third time granularity are one of seconds, minutes, hours, years, decades, centuries.

16. The non-transitory computer readable medium of claim 9, wherein each of the first plurality of database index buckets is identified by a hash value.

* * * * *